(12) United States Patent
Sharma et al.

(10) Patent No.: US 12,182,250 B2
(45) Date of Patent: Dec. 31, 2024

(54) CREDENTIALS MANAGEMENT AND USAGE IN APPLICATION MODERNIZATION

(71) Applicant: VMWARE LLC, Palo Alto, CA (US)

(72) Inventors: Avi Sharma, Neemuch (IN); Sri Narayanan Thanga Nadar, Kanyakumari (IN); Shivakumar Somapur, Gadag (IN); Ashok Aletty, San Ramon, CA (US); Kshitiz Sharma, Jaipur (IN); Gyanendra Pratap Singh, Bangalore (IN); William Lam, Campbell, CA (US); Ankita Sharma, Bangalore (IN); Ahil Kanna, Bangalore (IN)

(73) Assignee: VMware LLC, Palo Alto, CA (US)

(*) Notice: Subject to any disclaimer, the term of this patent is extended or adjusted under 35 U.S.C. 154(b) by 532 days.

(21) Appl. No.: 17/399,088

(22) Filed: Aug. 11, 2021

(65) Prior Publication Data
US 2022/0382849 A1 Dec. 1, 2022

(30) Foreign Application Priority Data
May 25, 2021 (IN) .............................. 202141023350

(51) Int. Cl.
*G06F 21/30* (2013.01)
*G06F 9/455* (2018.01)
(Continued)

(52) U.S. Cl.
CPC .......... *G06F 21/44* (2013.01); *G06F 9/45558* (2013.01); *G06F 9/5077* (2013.01);
(Continued)

(58) Field of Classification Search
CPC .... G06F 21/44; G06F 9/45558; G06F 9/5077; G06F 21/305; G06F 8/65;
(Continued)

(56) References Cited

U.S. PATENT DOCUMENTS

2014/0229934 A1* 8/2014 Larkin .................... G06F 9/452
718/1
2016/0028737 A1* 1/2016 Srinivasan .......... H04L 63/0807
726/4
(Continued)

FOREIGN PATENT DOCUMENTS

WO   WO-0111845 A2 * 2/2001 ......... H04L 63/0815
WO   WO-2009019146 A1 * 2/2009 ............... G06F 8/60

OTHER PUBLICATIONS

Desmond [online], "What is Containerization in DevOps," dated Dec. 9, 2020, retrieved on Nov. 9, 2021, retrieved from URL <https://www.liquidweb.com/kb/what-is-containerization-in-devops/>, 8 pages.
(Continued)

*Primary Examiner* — Ponnoreay Pich
*Assistant Examiner* — Mudasiru K Olaegbe
(74) *Attorney, Agent, or Firm* — King Intellectual Asset Management

(57) ABSTRACT

Credentials management and usage in application modernization can be implemented as computer-readable methods, media and systems. A notification identifying an application modernization operation is received. The operation is to be performed on an application deployed by multiple resources arranged in multiple hierarchical levels. A resource residing at a hierarchical level of the multiple hierarchical levels is identified. The application modernization operation is to be performed on the identified resource which has a resource type. A search for a credential is performed. The credential grants access to the resource to enable performing the application modernization operation. In response to the searching, a credential included in the multiple credentials is identified. The identified credential grants access either to the resource or to resources of the resource type. In response (Continued)

to receiving the notification, the identified credential is provided.

33 Claims, 7 Drawing Sheets

(51) Int. Cl.
   *G06F 9/50* (2006.01)
   *G06F 21/44* (2013.01)
(52) U.S. Cl.
   CPC .. *G06F 21/305* (2013.01); *G06F 2009/45587* (2013.01); *G06F 2221/2113* (2013.01); *G06F 2221/2145* (2013.01)
(58) Field of Classification Search
   CPC ... G06F 2009/45587; G06F 2221/2113; G06F 2221/2145; G06F 21/46; G06F 2221/2149; G06F 21/57
   See application file for complete search history.

(56) References Cited

U.S. PATENT DOCUMENTS

| | | | |
|---|---|---|---|
| 2017/0180335 A1* | 6/2017 | Quinlan | H04L 63/0815 |
| 2018/0067736 A1* | 3/2018 | De Zaeytijd | G06F 8/65 |

OTHER PUBLICATIONS

VMware Inc. [online], "vCenter Server," available on or before Jul. 16, 2016, retrieved on Nov. 9, 2021, retrieved from URL <https://www.vmware.com/products/vcenter-server.html>, 4 pages.

VMware Inc. [online], "Virtual Machine," available on or before Jul. 23, 2019, retrieved on Nov. 9, 2021, retrieved from URL <https://www.vmware.com/topics/glossary/content/virtual-machine>, 8 pages.

VMware Inc. [online], "vRealize Network Insight," available on or before Sep. 2, 2016, retrieved on Nov. 9, 2021, retrieved from URL <https://www.vmware.com/products/vrealize-network-insight.html>, 4 pages.

* cited by examiner

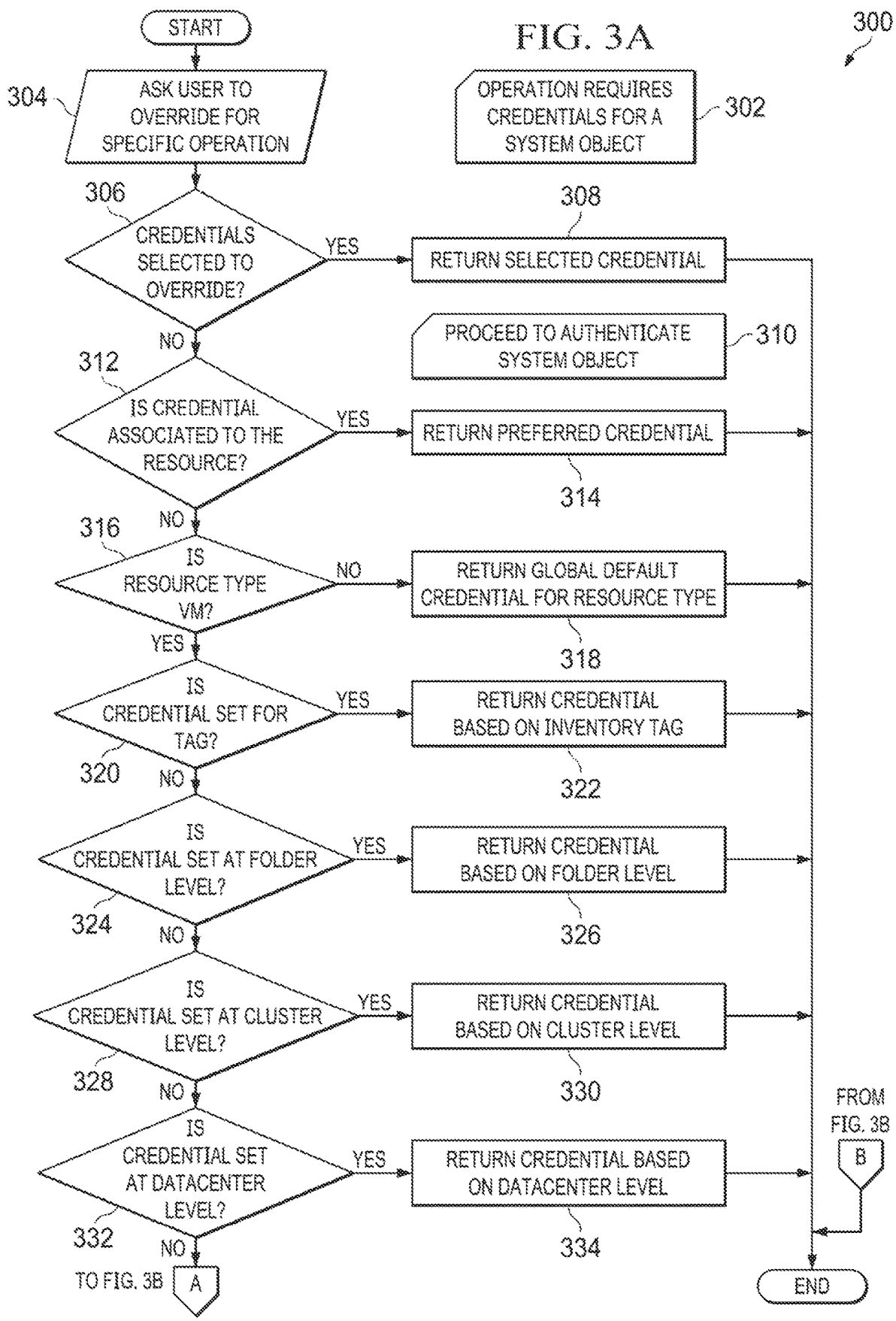

CREDENTIALS MANAGEMENT AND USAGE IN APPLICATION MODERNIZATION

RELATED APPLICATIONS

Benefit is claimed under 35 U.S.C. 119(a)-(d) to Foreign Application Serial No. 202141023350 filed in India entitled "CREDENTIALS MANAGEMENT AND USAGE IN APPLICATION MODERNIZATION", on May 25, 2021, by VMware, Inc., which is herein incorporated in its entirety by reference for all purposes.

TECHNICAL FIELD

This specification relates to application modernization, which is the practice of updating software for newer computing approaches.

BACKGROUND

Application modernization involves updating older software for newer computing approaches including newer languages, frameworks and infrastructure platforms. An application is deployed by executing multiple resources on computer systems. The process of application modernization can require access to one or more of the resources. In turn, the resources can be secured by credentials needed to access the resources.

SUMMARY

This specification describes technologies relating to credentials management and usage in application modernization.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B collectively is an example of a flow diagram showing credential management implemented by credential management system.

Like reference numbers and designations in the various drawings indicate like elements.

DETAILED DESCRIPTION

Figure 1:
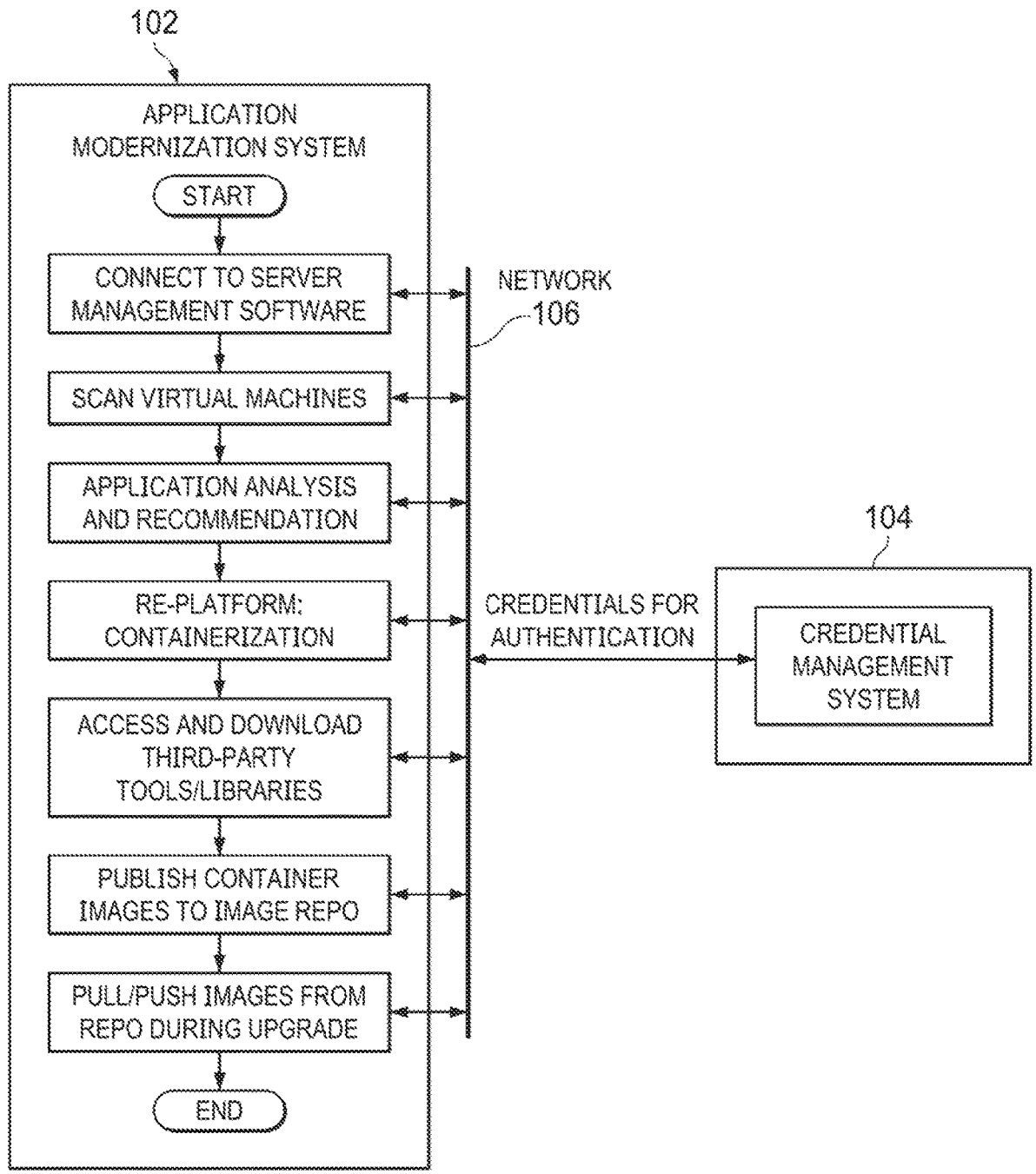
FIG. 1 is an example of a schematic diagram of an application modernization system operatively coupled to a credential management system.

Application modernization can be complex and time consuming because it requires authorized access to an organization's data-center platforms, applications, repositories, resources and other various systems. Also, the owner of a resource or organizational component that needs to be accessed may be different from the person needing access to the resource or the organizational component to implement the modernization. Given that the data-center platforms are handling thousands, if not tens of thousands, of resources and organizational components deployed across several virtual machines (VMs), handling different types of authentication mechanisms (password-based, token-based, key-based, etc.) is a challenge. Another challenge is to maintain confidentiality of these credentials while at the same time, allowing all users to collaborate without blocking each other.

This specification describes streamlining management and use of credentials in a purpose-built manner to cater to the evolving needs of application modernization. As described in this specification, the process of granting credentials to an application modernization system to access certain resources or organizational components is automated without needing a user to repeatedly (or manually) seek such credentials.

In application modernization, resources collectively refer to platforms/entities which are accessed at various stages of application modernization. Examples of resources include server management software that provides a centralized platform for controlling organizational application deployment environments. Such software may be deployed as an on-premises enterprise solution or may be deployed in a public cloud solution. Intelligent network flow (netflow) analysis system is another example of a resource that allows to build an optimized, highly-available and secure network infrastructure across cloud, hybrid, and multi-cloud environments. A VM is another example of a resource that uses software instead of a physical computer to run programs and deploy applications. One or more virtual guest machines run on a physical host machine. Each VM runs its own operating system and functions separately from the other VMs, even when they are all running on the same host. Organizational business accounts with permissions to access/upload/download files/software/tools are often third-party vendor accounts and are also resources. Image registries, e.g., public/enterprise image registries are another example of resources, which are managed even as repositories to be used to push/pull the containerized application's container-spec images.

A resource owner is a user who is authorized to perform read/write/execute actions on a resource or a group of resources. For example an administrator of the server management software who has access to the server is a resource owner for that server. Similarly, a user who has access to image repositories of the organization is a resource owner of the repository.

An operator is a user who takes an application to the application modernization journey. For example, a developer who understands the functioning of the application and can perform actions like containerization of the application is an operator. An operator of a resource need not be the owner of that resource.

An alias indicates a unique user-friendly name, which can help in easy identification. Credentials authenticate a user when logging into a resource over the network. Credentials can be a combination of username, password and then alias. Alternatively or in addition, a credential can be a combination of an authorization token and then alias, or a combination of secure shell (SSH) key and then alias, or any other authentication mechanism combined with an alias.

A credential is a generic and independent entity which can be used by or mapped to any type of resources on a specific resource or a group of resources. Once a credential is added to the system, it can be referred to by a unique alias. Doing so ensures confidentiality of the passwords/tokens/keys, as other users can use credentials only by referring to the alias. In other words, a credential is an independent generic entity that defines authentication attributes and is identified using a human-understandable unique alias. A credential can be associated with one or many resources, or one or more types of resources. As described more detail later, a global default credential is a default credential used to access a resource in case a resource specific credential is not specified, a global default credential is set for each resource type. Specifically associated credential and hierarchically associated credential are other types of credentials, also described later.

Containerization is the process of packaging software code, its required dependencies, configurations, and other details as container images to be easily deployed in the same or different computing environment.

Examples of process steps (i.e., tasks) implemented in automated application modernization include the following. A server management software is accessed and the server's inventory is scanned for available data centers, clusters and folder hierarchies. This task requires authentication with the server management software. The server's inventory is scanned to get a list of available VMs. This task can be performed in various ways—(a) scan for VMs in a specific group of servers/clusters/folders; (b) scan for VMs in a specific group of VM tags, which are logical groups of VMs (c) scan all available VMs in the data center. The VMs are scanned to identify the running processes and their details. This task requires authentication to Guest OS on the VMs. Based on scanning VMs and communicating with network flow analysis systems, a dependency topology graph and appropriate modernization recommendation is generated. For containerization, access to third-party tools/libraries are required that may depend on the component being containerized. Whereas containerization is one example of an application modernization task, other examples include re-hosting (i.e., moving to cloud) or re-factoring (i.e., changing architecture). Each of these tasks requires authentication to any such organizational business account. Once the container image is generated, it is pushed to the organization's enterprise/public image repository so that it can be accessed within the organization. This task requires authentication to the repository. For managing upgrades and patches to the container images, images are pulled from the repository and pushed back after upgrades/patch. This task requires authentication to the repository.

This specification describes techniques to allow users to add a credential, assign it to a specific resource, or assign it to a group of resources. For example, bulk assigning credentials to a set of virtual machines allows users to assign credentials in one-go rather than repeatedly assigning the credential to each VM. The system provides flexibility to the user to assign the same credentials to any resource type and any number of resources. For example, if the server management software and VM have the same credential, then the same credential can be attached to both for use. The resource could also be a collection object, e.g., a VM folder, a host, a host cluster or the server management software itself. The concept of global defaults allows users to define system-wide default credentials to use for the type of resource, e.g., setting a credential as global default for a Linux VM or for a Windows VM or for server management software. This way, users don't need to explicitly associate credentials to resources that have the same credentials as the global defaults.

FIG. 1 is an example of a schematic diagram of an application modernization system 102 operatively coupled to a credential management system 104 via an application programming interface (API) 106, which, in some instances, can be a connection over a network. The application modernization system 102 is configured to implement the application modernization tasks described above. To do so, the application modernization system 102 communicates with the credential management system 104 to get credentials to access a component (e.g., a resource, a group of resources, a resource type, or other components to which the application modernization system 102 needs access to implement the modernization tasks). In some implementations, when the application modernization system 102 requires a credential to authenticate to a resource, the credential management system 104 attempts to find the best match credential which can be used based on a series of matching criteria, as described later with reference to FIGS. 3A and 3B. If the credential management system 104 has previously assigned a resource level credential (i.e., a specifically associated credential) to the resource, then the credential management system 104 uses that credential to authenticate to the resource.

Otherwise, the credential management system 104 implements a series of checks to identify an appropriate credential. For example, the credential management system 104 checks if the resource type is a VM. If yes, the credential management system 104 then checks if there is a default credential assigned to a logical group to which this VM belongs. If yes, then the credential management system 104 uses that credential to authenticate the resource type. The credential management system 104 follows a certain order when checking the credential of the group. For example, the credential management system 104 first checks if default is set for any tags of this VM, second checks if default is set for parent folder of VM, third checks if default is set for parent cluster of VM, and four checks if default is set for operating system type of VM. After these checks, if the credential management system 104 determines an absence of a credential, the credential management system 104 checks if there is a global default set for this resource type. After each checking step, if the credential management system 104 finds a credential, then the credential management system 104 uses that credential to authenticate the resource.

As described earlier, credentials for different resources or different resource types or different components of the application are created by the resource owners. The credentials can be managed (i.e., updated or deleted) only by those resource owners. As such, changes will automatically reflect when trying to authenticate to any associated resource. In addition, the credential management system 104 ensures that a credential cannot be deleted till it is assigned to at least one resource. In other words, a credential can be deleted only if it is not associated with any resource(s) or default(s). Operations that the credential management system 104 can implement include (1) adding and updating/deleting credentials, (2) setting/resetting global default credentials, (3) setting default credentials for various operating system types part of data center, (4) setting default credentials per inventory hierarchy level (data center/cluster/folder level), (5) setting default credentials for inventory tags assigned to VMs, (6) assigning specifically associated credentials to a resource for accessing an object, (7) assigning a credential to a group of VMs in bulk, (8) allowing a user to provide a credential reference specifically for an operation which overrides the current assigned credential without actually changing the existing credential assignment (operational override).

Figure 2:
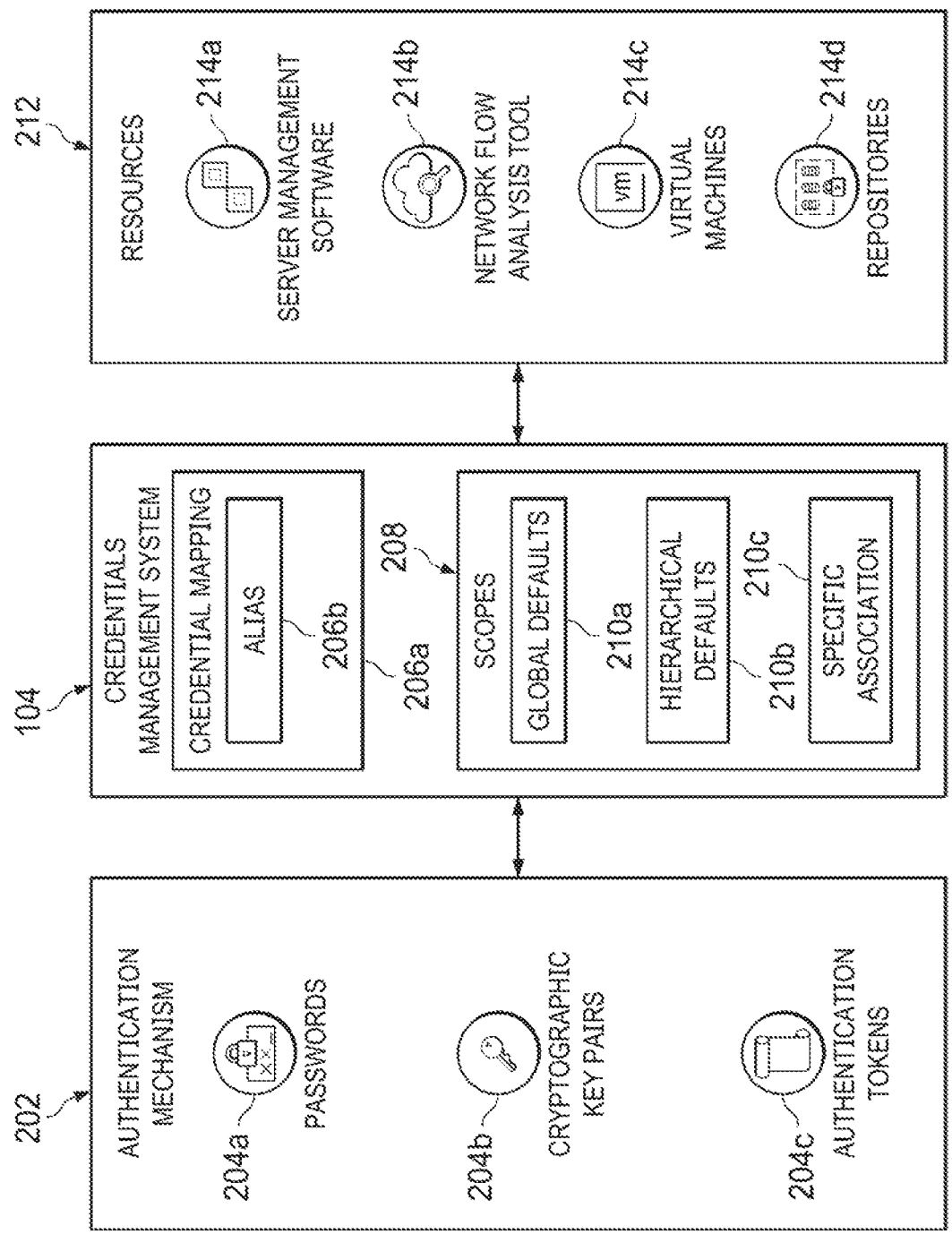
FIG. 2 is an example of a schematic of the credential management system showing credential mapping.

FIG. 2 is an example of a schematic of the credential management system 104 showing credential mapping. In some implementations, the credential management system 104 creates credentials as an independent/genetic entity not coupled with any resource to which the credential points, i.e., to which the credential is associated. As shown in FIG. 2, the authentication mechanisms 202 used when a credential is implemented include passwords 204a, cryptographic key pairs 204b, authentication tokens 204c, other authentication mechanisms, or any combination of them. The resources 212 to which the credentials are associated include server management software 214a, network flow analysis tool 214b, VMs 214c and repositories 214d.

The credentials management system 104 creates a credential by associating an authentication mechanism with an alias 206b. In some implementations, the credential management system 104 creates credentials to have two parts. The first part is the credential mapping 206a which includes the alias 206b which is a user-defined, human-readable or understandable name. The credential management system 104 uses the alias to map to any of the authentication mechanisms to allow access to a resource. The second part is the Scopes 208 of the credential. The credential management system 104 allows users to define credential scopes at various levels. For example, a global default credential 210a is one which, for a particular operation, does not specify any credential for accessing the resource. Instead, if there is a global default credential that is set, then the credential management system will identify and pass that credential to the application modernization system 102 of FIG. 1 to allow the application modernization system 102 to access that resource.

Another credential scope is hierarchically default credential 210b, which are credentials specific to a logical group of resources. In a data center, there is a hierarchy of inventory objects-folders, clusters, VM tags (i.e., hierarchical entities within a data center). The credential management system 104 can set a hierarchically default credential at each of those levels. Another credential scope is specifically associated credential 210c, which is a credential which the credential management system 104 associates to a specific entity. For example, if an application is deployed across ten data centers, then the credential management system 104 can be used to assign a specifically associated credential to each data center. In this manner, the credential management system 104 can apply a credential to any resource such as a data center, a network analysis tool, a VM, an image repository, or other resource. Having assigned credentials to resources in this manner, the credential management system 104 can return credentials to that resource, the scope of the access being tied to the type of credential assigned.

Figure 3B:
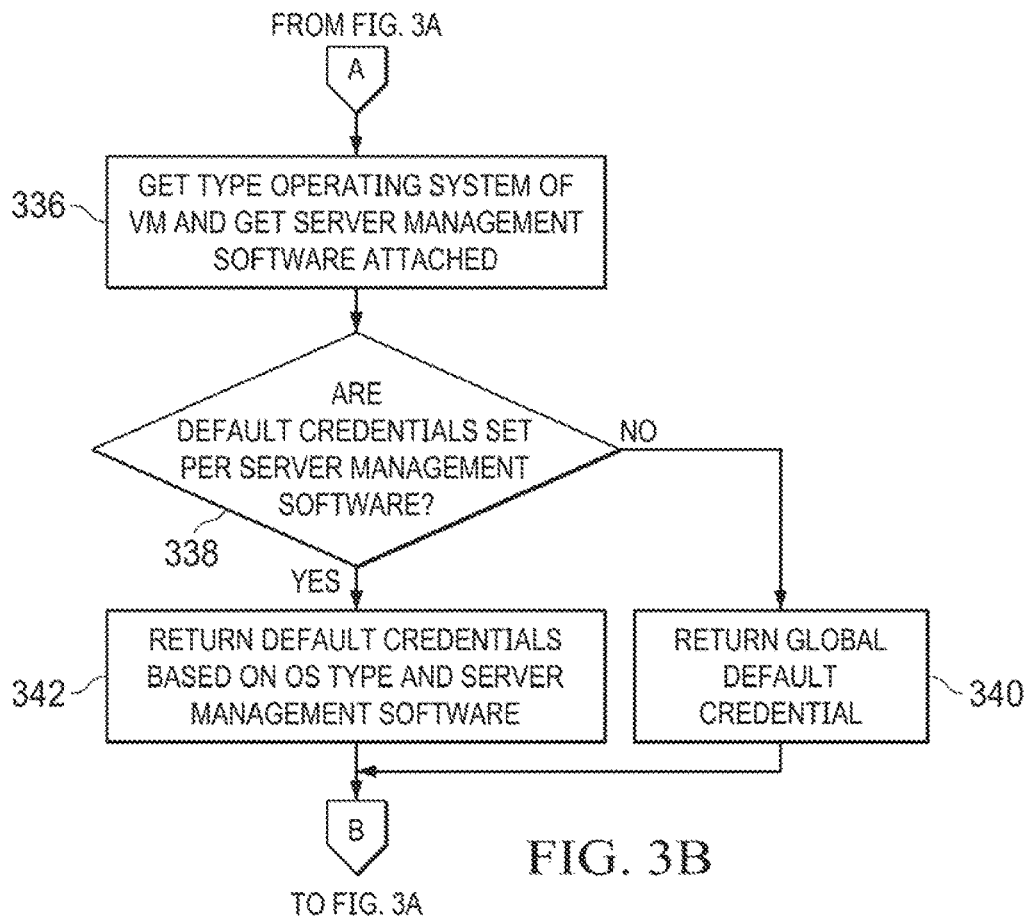

FIGS. 3A and 3B collectively is an example of a flow diagram 300 showing credentials management implemented by the credential management system 104 of FIG. 1. In some implementations, the flow diagram 300 is implemented by the credential management system 104 in response to receiving a request or a notification from the application modernization system 102 to access a resource. The operations described in the flow diagram 300 are automatically performed by the computer systems that implement the credential management system 104 necessitating minimal or no intervention by a human operator.

At 302, the credential management system 104 receives a message on notification that an application modernization operation requires credentials for a system object. At 304, the credential management system 104 implements an operational override whereby the credential management system 104 notifies a user to ask for credentials to access the resource. At 306, the credential management system 104 checks if operational override credentials have been selected. If yes, then at 308, the credential management system 104 returns the selected credential. By returning the selected credential, it is meant that the credential management system 104 passes the selected credential to the application modernization system 102 so that the application modernization system 102 can access the necessary resource to perform the application modernization task. If no, then at 312, the credential management system 104 checks if a credential is associated to the resource (i.e., a specifically associated credential). If yes, then at 314, the credential management system 104 returns the specifically associated credential. If no, then at 316, the credential management system 104 checks if the resource type is a VM. If no, then at 318, the credential management system 104 returns a global default credential for that resource type. If the credential management system 104 is unable to identify a global default credential for that resource type, then the credential management system 104 returns an error message. The error message is an indication that the credential management system 104 is unable to return a credential. If, at 316, the credential management system 104 determines that the resource type is VM, then, at 320, the credential management system 104 checks if a specifically associated credential is associated with the VM tag. If yes, then at 322, the credential management system 104 returns a specifically associated credential based on the VM tag. If, at 320, the credential management system 104 determines that a specifically associated credential is not set for the VM tag, then, at 324, the credential management system 104 checks if a hierarchically default credential is set at a folder level, the folder level being one level above the VMs in the hierarchy. If yes, then at 326, the credential management system 104 returns the hierarchically default credential based on the folder level. If, at 324, the credential management system 104 determines that the hierarchically default credential is not set that the folder level, then, at 328, the credential management system 104 checks if a hierarchically default credential is set at a cluster level, the cluster level being one level above the folder level in the hierarchy. If yes, then at 330, the credential management system 104 returns the hierarchically default credential based on the cluster level. If, at 328, the credential management system 104 determines that the hierarchically default credential is not set at the cluster level, then, at 332, the credential management system 104 checks if a hierarchically default credential is set at a data center level, the data center level being one level above the cluster level in the hierarchy. If yes, then at 334, the credential management system 104 returns the hierarchically default credential based on the data center level. If, at 332, the credential management system 104 determines that the hierarchically default credential is not set at the data center level, then, at 336, the credential management system 104 identifies the operating system type of the VM and identifies the attached server management software. In the operations table (described below), when "Scan data center for running VMs" operation is performed, some details about the VMs are collected from the server management software. This data includes guest OS type and version running in the VM. At 338, the credential management system 104 checks if default credentials are set at server management software for that OS type. If yes, at 342, the credential management system 104 returns default credentials based on operating system type and server management software. If no, then, at 340, the credential management system 104 returns global default credential for OS type. The credential management system 104 returns the credential to the application modernization system 102, which, at 310, uses the returned credential to proceed to authenticate the system object.

Examples of operations on various resources and the usage of credentials is listed in the table below.

| Operation | Resource(s) Accessed | Access Method | Credential Type(s) | Applicable Defaults | Details |
|---|---|---|---|---|---|
| Register data center | Data center | API | username-password | Global default for 'data center' resource type | Register data center URL and credentials |
| Scan data center for running VMs | Data center | API | username-password | Global default for 'data center' resource type | 1. Data center or any of its hierarchy levels can be scanned to get available VMs 2. Hierarchy levels: Data Center > Datacenter > Cluster > Folder |
| Scan VMs for running processes | 1. Data center 2. VMs | API | username-password | 1. Global default for 'data center' resource type 2. Global/hierarchical default for VM | 1. Scripts are copied to VMs using data center API and VM credentials. 2. Scripts are then executed and the results are copied out of the VM. 3. Using results, identified the application processes running on the VMs. |
| Attach network-flow analysis tool to data center | 1. Data center 2. Network flow analysis tool | API | 1. username-password 2. Authentication Token | Global default for 'data center' & 'network flow analysis tool' resource type | 1. Add data center to network flow analysis tool for performing network flow analysis on the scanned VMs. 2. Depending on type of network flow analysis tool, authentication may either need a username-password or a token. |
| Get network flow analysis data from network flow analysis tool | Network flow analysis tool | API | 1. username-password 2. Authentication Token | Global default for 'network flow analysis tool' resource type | Get the network flow analysis data collected by network flow analysis tool |
| Containerization | 1. Data center 2. VMs | API | 1. username-password | 1. Global default for | 1. Base OS images are |

| Operation | Resource(s) Accessed | Access Method | Credential Type(s) | Applicable Defaults | Details |
|---|---|---|---|---|---|
| | 3. Third-party vendor accounts 4. Docker Hub/enterprise image repository(repo) | | 2. Authentication Token | 'data center' resource type 2. Global/ hierarchical default for VM 3. Global default for 'vendor account' type 4. Global default for 'image repo' type 5. Global default for 'Docker hub' type | downloaded from Docker hub/enterprise repo. 2. Application data is copied from VM to be added to container images. 3. Required tools are downloaded from third-party vendor accounts for image creation. |
| Upload container images | 1. Docker Hub/enterprise image repository(repo) | API | 1. username-password 2. Authentication Token | 1. Global default for 'image repo' type 2. Global default for 'Docker hub' type | Generated images are uploaded to user specified repository |
| Container image upgrades and patches | 1. Docker Hub/enterprise image repository(repo) | API | 1. username-password 2. Authentication Token | 1. Global default for 'image repo' type 2. Global default for 'Docker hub' type | 1. Images are downloaded from image repo. 2. After upgrades and patches are performed, upload the new images to the repo |

Figure 4:
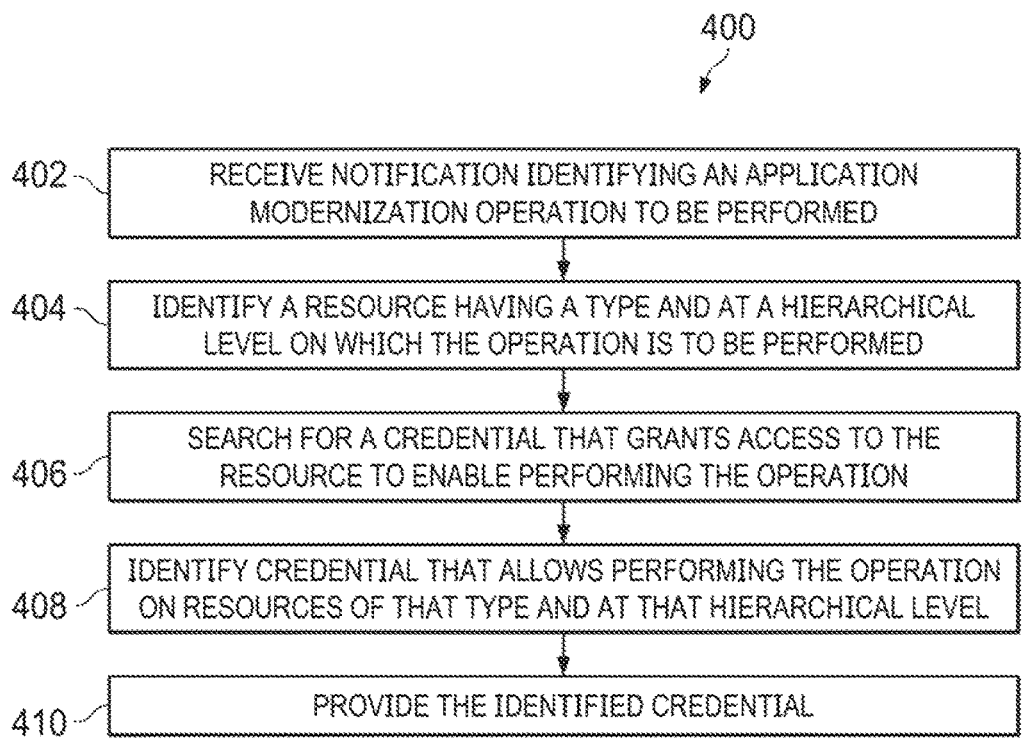
FIG. 4 is an example of a flowchart of an example process for credential management.
Figure 5A:
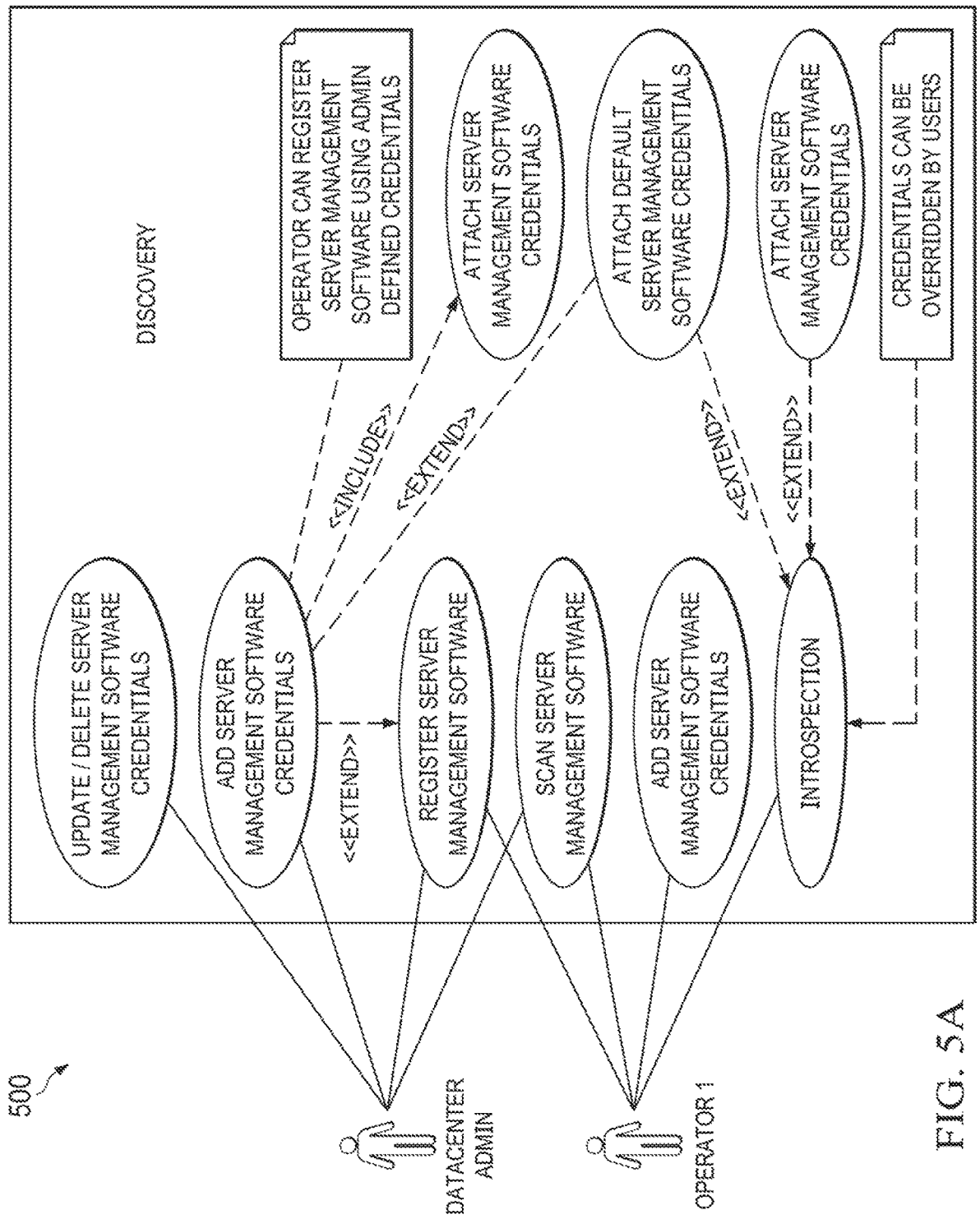
FIGS. 5A and 5B collectively is an example of a use case implemented by the application modernization system and the credential management system.
Figure 5B:
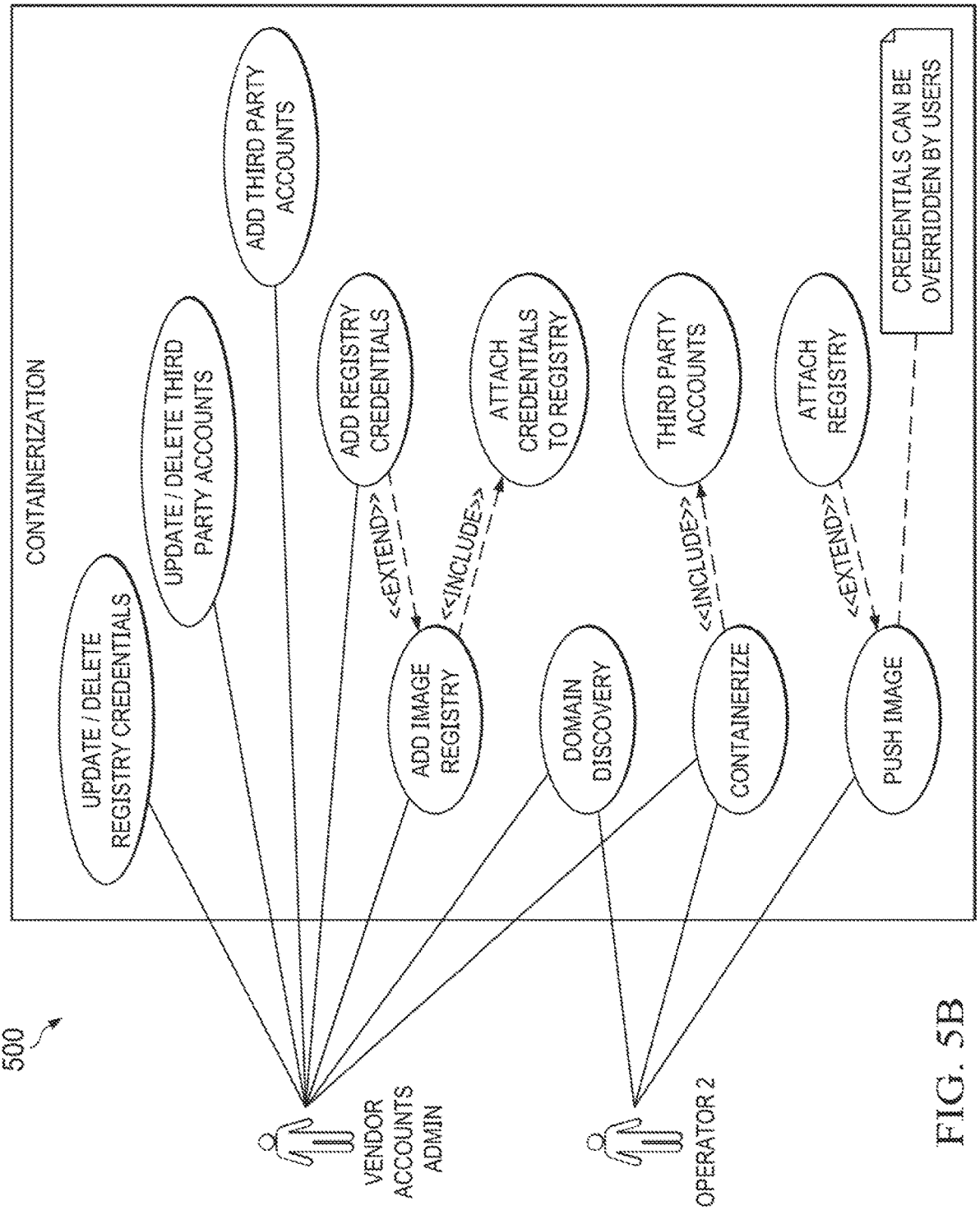

FIG. 4 is an example of a flowchart of an example process 400 for credentials management. In some implementations, the process 400 is implemented by the credential management system 104 of FIG. 1. At 402, the credential management system 104 receives a notification identifying an application modernization operation to be performed on an application deployed by multiple resources arranged in multiple hierarchical levels. At 404, the credential management system identifies a resource reciting at a hierarchical level of the multiple hierarchical levels. The application modernization operation is to be performed on the identified resource which has a resource type. At 406, the credential management system 104 searches for a credential that grants access to the resource to enable performing the application modernization operation. The credential is included in multiple credentials that map to corresponding multiple hierarchy levels. At 408, in response to the searching, the credential management system 104 identifies a credential included in the multiple credentials. The identified credential grants access to resources of the resource type. At 410 and in response to receiving the notification at 402, the credential management system 104 provides the identified credential FIGS. 5A and 5B collectively is an example of a use case (schematically represented by reference numeral 500) implemented by the application modernization system 102 and the credential management system 104 of FIG. 1. The use case organization wants to containerize its applications running on certain servers. The organization's data center is managed by a data center admin who has access to the data center and can authenticate to it. The organization also has a third party vendor accounts administrator who has access credentials to an organization's third-party accounts like "my Oracle support account" and Docker Hub. The operators in this scenario ("operator 1" and "operator 2") are application developers who are involved in application development and can access VMs where the applications are deployed.

In the discovery scenario, for identifying running processes of applications, (1) the data center admin can add/update/delete data center credentials; (2) operator 1 can then register a data center by attaching data center credential and scan the data center to get inventory hierarchy with VMs; (3) for scanning multiple VMs with identical credentials the operator 1 adds the credential once and then performs the bulk assignment of VM credentials; (4) operator 1 discovers Web logic processes and required metadata by performing introspection on VMs.

In the containerization scenario, for containerizing the applications, (1) third-party vendor accounts admin adds credentials to third-party accounts and organizations image registry (e.g., docker hub) which will be used by operator 2 during containerization; (2) operator 2 uses existing default credentials associated with the VMs (done by operator 1 in the discovery scenario) to discover Web logic server configurations and details (domain discovery); (3) after domain discovery is complete, containerization can be started by attaching "my Oracle support account" credentials for downloading Web logic image tools; (4) as part of containerization, application-specific images are built which are then pushed to the image repository; (5) docker hub credentials are updated by the third-party vendor accounts admin without blocking operator 2 who refers to the credential only by its alias; (6) operator 2 pushes the applications containing an image to Docker or hub, which was already authenticated by third-party vendor accounts admin in step (5).

In some implementations, multiple credentials can be bulk-imported, i.e., simultaneously imported, and associated with resources using a policy whereby multiple credentials are simultaneously associated with respective resources rather than associating a credential with a resource, one at a time. Such bulk-importing and bulk-association allows configuring OS credentials in a more scalable manner to support a large number of VMs in an enterprise environment. As described below, the bulk-importing and bulk-association can be implemented with a REST API for programmatic import and configuration, and a file upload in JSON/YAML format. In some implementations, the credential management system 104 can assign a credential to a resource based on a group of matching criteria (or rules) rather than assigning the credentials in a pick-and-choose manner. In this manner, the credential management system 104 can add multiple credentials to corresponding VMs in one-go (bulk-import), associate many or all global defaults in one-go (bulk-associate defaults), and define association rules for a credential. Based on the user-defined rules, the credential management system 104 can find a match for the resources and associate that credential to the resource (rules-based association).

By implementing such techniques, the credential management system 104 can bulk import and associate credentials and also bulk-associate global defaults to resources. Once defined, the credential management system 104 can apply rules when scanning the server management software hierarchy to discover resources (e.g., VMs) for the first time. Based on the defined rules, the credential management system 104 can find a credential match for the newly discovered resources. Doing so allows user to actually perform "Scan and introspect" in one-go. Doing so also helps in reducing number of clicks/flow-iterations for a user to discover components, as incorrect/unassociated credential errors can be minimized. A user-defined rule-based approach gives user flexibility to manage credentials at scale, with ease.

To define a policy for bulk-association of credentials, a user can define an association rule using a combination of the following criteria values: resource identifier (e.g., VM MoID), resource name (e.g., VM name regex), server management software name (e.g., vCenter name), data center name, cluster name, resource folder name, resource tags (e.g., VM tags), Guest OS type or any combination of them. For each credential, the user can define any number of such rules.

Within a rule, the cluster management system 104 uses an "AND" strategy to find a match. For example, the cluster management system 104 searches for an intersection of resources (e.g., VMs) matched by each criteria of the rule. For example, if a rule specifies a VM folder name and a VM name regex then, the cluster management system 104 includes only those VMs that match the name regex and are part of the specified folder as matching the rule. Within multiple rules, the cluster management system 104 can implement an "OR" strategy to find a match. For example, the cluster management system 104 can identify a union of the VMs matched by each rule. For example, if one rule specified VM tags, and another rule specified VM MoID, then the cluster management system 104 will match all those VMs that have the tags OR have the MoID.

Sometimes, it may happen that association rules for two credentials match the same resource. For such cases, the cluster management system 104 tries Guest OS login using GuestOperationsAPI with all conflicting credentials. The cluster management system 104 associates the first credential which succeeds login attempt. If all of the credentials fail to login, the cluster management system 104 returns a failure message.

Association rules validate API response returns a list of credentials mapped to the list of VMs which were matched based on the specified rules. User can choose to apply the rules after verifying the response. Or, the user can update the rules if matching was not performed as expected and then apply them.

In sum, in an organization, an individual user does not have access to all the systems and applications. For example, a data center admin may have access to data center credentials, but cannot validate an applications characteristics or interdependencies. The validation can only be done by the owner/developer of the application. The techniques described here allow both users to perform their tasks seamlessly while also maintaining the confidentiality of their login details. To do so, the techniques described here, which are implemented by the credential management system 104, can allow one user to add the credentials in the system and another user to simply use it based on the alias without actually knowing the password. The credential management system 104 can further allow one user to set global defaults for the resource, and another user to perform the tasks without even providing a credential.

Modern data centers are fully virtualized, software-defined and highly automated, capable of hosting thousands of applications across a hybrid cloud environment. To gather insights about all the running VMs, an analysis of the running processes on the VM is needed, which requires logging into the guest operating system and fetching details. The techniques described here allow a user to perform analysis without being prompted for credentials for any of the VMs being analyzed. To do so, the techniques described here, which are implemented by the credential management system 104, can simplify the way users interact with these resources without repeatedly giving identical inputs. In some implementations, the credential management system 104 allows users to assign a credential to a set of VMs in one go (i.e., a bulk assignment). The credential management system 104 allows defining global defaults at various levels and logical groups. Since users do not need to continuously provide inputs to the system, the techniques described here can reduce overall scan time due to the reduction or absence of manual intervention.

As described earlier, the application modernization journey requires involvement of various stakeholders of an organization belonging to different roles and areas of expertise. The techniques described here, which can be implemented by the credential management system 104, can efficiently execute various stages of the modernization journey. By leveraging the credential system and the global defaults, resource owners can allow other users to use the existing credentials, thus eliminating the dependency on each other.

Some credentials may also be identical for resources or a subset of the resources. The techniques described here, which are implemented by the credential management system 104, allow different resources to use the same credential without duplicating them for each object. To do so, in some implementations, the credential management system 104 can share the same credential between N number of resources. The credential management system 104 can share the same credential as a global default for N resource types. Doing so avoids duplication of data, and this abstraction allows the credential to be a generic entity that can be shared between any type of resource.

A data center allows logical grouping of VMs at various levels: clusters, folders, resource pools, VM tags. The techniques described here, which can be implemented by the credential management system 104, allow users to associate a credential with these groups, if needed, so that user experience can be improved. To do so, in some implementations, the credential management system 104 allows users to set default credentials at each of these logical levels in the data center inventory hierarchy.

The abstraction provided by the credential management system 104 allows credentials to be a generic entity that can also be associated to any new resource type for authentication. As described earlier, integrity of credentials are maintained since only the resource owners can update or delete credentials which they added. Since the credential management system 104 allows a credential to be assigned to multiple resources, the safe delete mechanism described earlier ensures that the credential cannot be deleted until it is assigned to at least one resource. In addition, the credential management system 104 preserves logs identifying which credentials are used during various operations along with the username who used the credentials. Resource owners can easily monitor and track credential usage.

Figure 6:
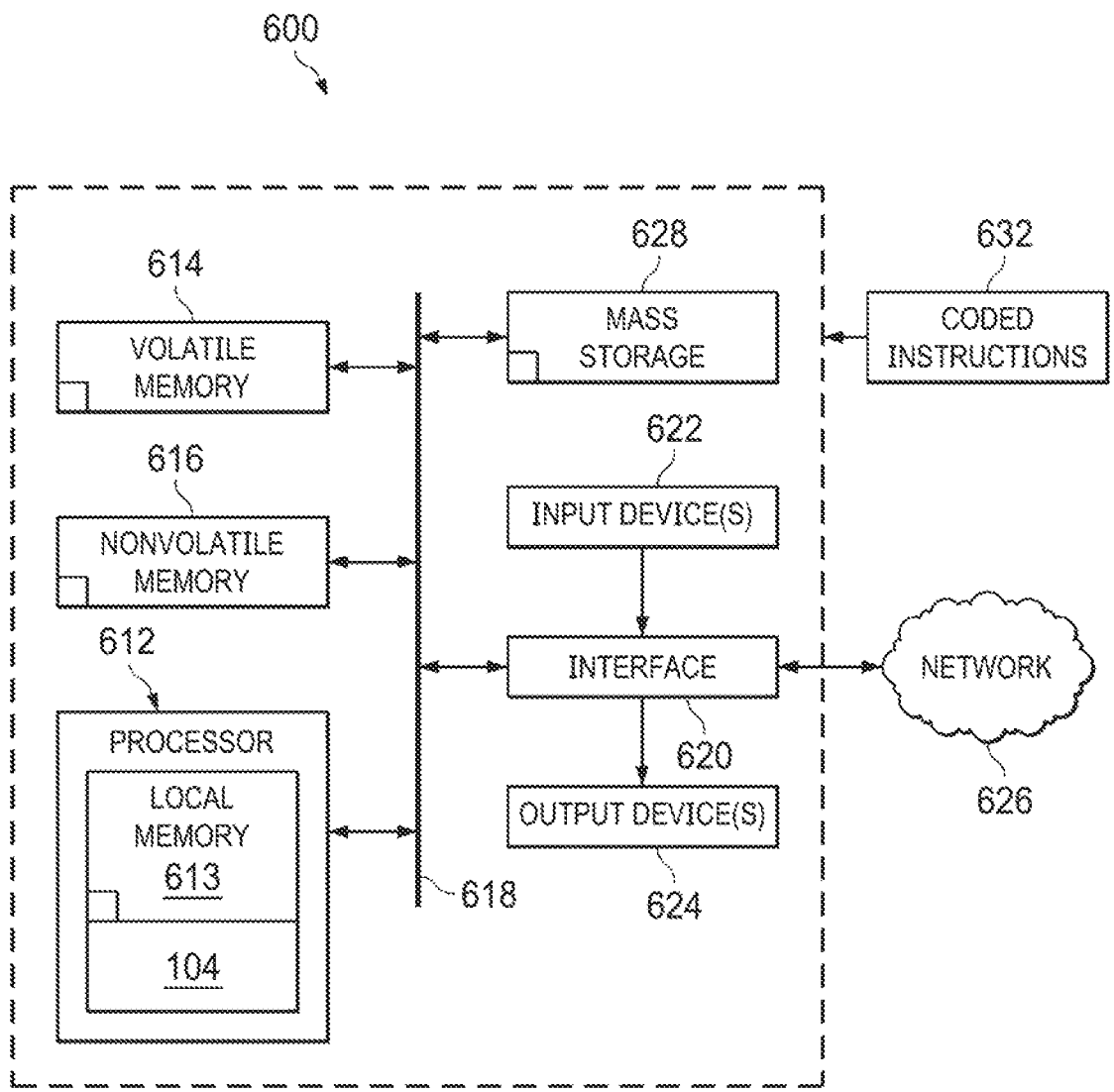
FIG. 6 is a block diagram of an example of a processing platform.

FIG. 6 is a block diagram of an example of a processing platform 600 configured to execute the techniques described in this disclosure, specifically, the methods described above with reference to FIGS. 1-4. The processor platform 600 can be, for example, a server, personal computer, workstation, self-learning machine (e.g., a neural network), mobile device (e.g., a cell phone, smart phone, tablet computer), personal digital assistant (PDA), an Internet appliance, or any other type of computing device. In some implementations, the processor 612 implements the components shown in FIG. 1, especially, the credential management system 104.

The processor platform 600 includes a processor 612, which is hardware. For example, the processor 612 can be implemented by one or more integrated circuits, logic circuits, microprocessors, graphics processing units (GPUs), digital signal processors (DSPs), or controllers. The hardware processor 612 can be a semiconductor, e.g., silicon, based device. The hardware processor 612 can implement the components of the systems (for example, the credential management system 104 and the application modernization system 102).

The processor 612 includes a local memory 613 (e.g., a cache). The process 612 is in communication with a main memory including a volatile memory 614 and a non-volatile memory 616 via a bus 618. The volatile memory 614 can be implemented by synchronous dynamic random access memory (SDRAM), dynamic random access memory (DRAM) or other type of random access memory device. The non-volatile memory 616 can be implemented by flash memory and/or any other desired type of memory device. A memory controller controls access to the main memory 614, 616.

The process platform 600 also includes an interface circuit 620 implemented by any type of interface standard, for example, an Ethernet interface, a universal serial bus (USB), a wired or wireless interface, a near field communication (NFC) interface and/or a PCI express interface. One or more input devices 622 are connected to the interface circuit 620. The input devices permit a user to enter data and/or commands to the processor 612. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620. The output devices 624 can be implemented, for example, by display devices, e.g., light emitting diode (LED), an organic LED (OLED), a liquid crystal display (LCD), a cathode ray tube display (CRT), an in-place switching (IPS) display, a touchscreen, etc. and/or a tactile output device, a printer and/or speaker. The interface circuit 620 typically includes a graphics driver card, a graphics driver chip and/or a graphics driver processor.

The interface circuit 620 also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, coaxial cable system, satellite system, line-of-site wireless system, cellular telephone system, etc.

The processor platform 600 also includes one or more mass storage devices 628 for storing software and/or data. Examples of such mass storage devices 628 include floppy disk drives, hard disk drives, compact disk drives, redundant array of independent disks (RAID) systems, digital versatile disk (DVD) drives, or combinations of the above.

Machine executable instructions 632 (or coded instructions) represented by the flowchart of FIG. 6 can be stored in the mass storage device 628, in the volatile memory 614, in the non-volatile memory 616, and/or on a removable non-transitory computer readable storage medium such as a CD or DIV.

Certain aspects of the subject matter described here can be implemented as a method. A notification identifying an application modernization operation is received. The operation is to be performed on an application deployed by multiple resources arranged in multiple hierarchical levels. A resource residing at a hierarchical level of the multiple hierarchical levels is identified. The application modernization operation is to be performed on the identified resource which has a resource type. A search for a credential is performed. The credential grants access to the resource to enable performing the application modernization operation. In response to the searching, a credential included in the multiple credentials is identified. The identified credential grants access either to the resource or to resources of the resource type. In response to receiving the notification, the identified credential is provided.

An aspect combinable with any other aspect includes the following features. The resource is a first resource. To identify, in response to the searching, the credential that grants access either to the resource or to resources having the resource type and that reside at the hierarchical level, it is determined that a specifically associated credential is associated to the first resource, and the specifically associated credential is returned.

An aspect combinable with any other aspect includes the following features. The resource is a second resource. To identify, in response to the searching, the credential that grants access either to the resource or to resources having the resource type and that reside at the hierarchical level, it is determined that no specifically associated credential is associated to the second resource. In response to doing so, a search for a hierarchical default credential is performed. The hierarchical default credential is associated to a hierarchical level above the hierarchical level at which the second resource resides. The hierarchical default credential grants access to all resources at the hierarchical level at which the second resource resides.

An aspect combinable with any other aspect includes the following features. In response to searching for the hierarchical default credential, it is determined that the hierarchical default credential is associated to the hierarchical level above the hierarchical level at which the second resource resides. The hierarchical default credential is returned.

An aspect combinable with any other aspect includes the following features. The resource is a third resource. To identify, in response to the searching, the credential that grants access either to the resource or to resources having the resource type and that reside at the hierarchical level, (i) it is determined that no specifically associated credential is associated to the third resource, (ii) it is determined that no hierarchically default credential is associated to a hierarchical level above the hierarchical level at which the third resource resides, and in response to process steps (i) and (ii), a search for a global default credential is performed. The global default credential is associated to a root level of the multiple levels.

An aspect combinable with any other aspect includes the following features. In response to searching for the global default credential, it is determined that the global default credential is associated to the root level. The global default credential associated to the root level is returned.

An aspect combinable with any other aspect includes the following features. In response to searching for the global default credential, it is determined that no global default credential is associated to the root level. An error message indicating an inability to return a credential is returned.

An aspect combinable with any other aspect includes the following features. The resource is a fourth resource. Before searching for a credential that grants access to the resource to enable performing the application modernization operation, input to associate a credential to the fourth resource is received. The credential is assigned to the fourth resource. The assigned credential overrides any other credential associated with the fourth resource.

An aspect combinable with any other aspect includes the following features. The resource is a virtual machine. In response to searching for the credential, it is determined that no specifically associated credential is associated to the virtual machine. In response to determining that no specifically associated credential is associated to the virtual machine, a global default credential associated to all virtual machines is returned.

An aspect combinable with any other aspect includes the following features. In response to providing the identified credential, the identified credential is received. The resource is accessed using the received credential. The application modernization operation is performed on the accessed resource.

An aspect combinable with any other aspect includes the following features. To identify, in response to the searching, the credential that grants access either to the resource or to resources having the resource type and that reside at the hierarchical level, a rule set associating credentials to resources id identified. It is determined that the fifth resource is associated with criteria that satisfies the rule set. In response such determining, the credentials with which the rule set is associated is associated to the fifth resource.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a system that includes one or more processors including a hardware-based processor, and a memory storage including a non-transitory computer-readable medium storing instructions which, when executed by the one or more processors performs operations including the methods described here.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination or in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:
1. A method comprising:
  receiving, at credential management system and via an application programming interface (API), a notification identifying an application modernization operation to be performed on an application deployed by one of a plurality of resources arranged in a plurality of hierarchical levels;
  identifying, by the credential management system, a resource on which the application modernization operation is to be performed, the resource having a resource type and residing at a hierarchical level of the plurality of hierarchical levels;
  searching, by the credential management system and from among a plurality of credentials, for a credential that grants access to the resource to perform the application modernization operation, each of the plurality of credentials mapping to one of plurality of hierarchical levels;

determining, by the credential management system and in response to the searching, that no credential is specifically associated to the resource;

performing by the credential management system and in response to determining that no credential is specifically associated to the resource, additional searching for a credential that grants access to the resource to enable performing the application modernization operation but that is not specifically associated to the resource;

identifying, by the credential management system and in response to the additional searching, a credential included in the plurality of credentials, that grants access either to the resource or to resources of the resource type; and providing, by the credential management system and in response to receiving the notification, the identified credential via the API.

2. The method of claim 1, wherein the resource comprises one of the following:
a virtual machine;
a container;
a cluster;
server management software; or
a collection object.

3. The method of claim 1, wherein performing additional searching comprises:
searching for a hierarchical default credential associated to a hierarchical level above the hierarchical level at which the resource resides, wherein the hierarchical default credential grants access to all resources at the hierarchical level at which the resource resides.

4. The method of claim 3, further comprising, in response to searching for the hierarchical default credential:
determining that the hierarchical default credential is associated to the hierarchical level above the hierarchical level at which the resource resides; and
returning the hierarchical default credential.

5. The method of claim 1, wherein performing additional searching comprises: determining that no hierarchically default credential is associated to a hierarchical level above the hierarchical level at which the resource resides; and
in response determining that no hierarchically default credential is associated to a hierarchical level above the hierarchical level at which the resource resides, searching for a global default credential associated to a root level of the plurality of levels.

6. The method of claim 5, further comprising, in response to searching for the global default credential:
determining that the global default credential is associated to the root level; and
returning the global default credential associated to the root level.

7. The method of claim 1, further comprising:
scanning, by an application modernization system, a data center;
identifying, based at least in part on the scanning, the application; and
notifying, by the application modernization system and via the API, the credential management system of the application modernization operation.

8. The method of claim 1, wherein the resource is one of a plurality of similar resources, and wherein the identified credential provides access to each of the similar resources.

9. The method of claim 1, wherein performing additional searching comprises:
determining that no specifically associated credential is associated to the resource; and
in response to determining that no specifically associated credential is associated to the resource, returning a global default credential associated to all resources having the same resource type as the resource.

10. The method of claim 1, further comprising, in response to providing the identified credential:
receiving, by an application modernization system and via the API, the identified credential;
accessing, by the application modernization system, the resource using the received credential; and
performing, by the application modernization system, the application modernization operation on the accessed resource.

11. The method of claim 1, wherein the application modernization operation comprises containerizing an application.

12. A non-transitory computer-readable medium storing instructions which, when executed by a hardware-based processor, performs operations comprising:
receiving, at credential management system and via an application programming interface (API), a notification identifying an application modernization operation to be performed on an application deployed by one of a plurality of resources arranged in a plurality of hierarchical levels;

identifying, by the credential management system, a resource on which the application modernization operation is to be performed, the resource having a resource type and residing at a hierarchical level of the plurality of hierarchical levels;

searching, by the credential management system and from among a plurality of credentials, for a credential that grants access to the resource to perform the application modernization operation, each of the plurality of credentials mapping to one of plurality of hierarchical levels;

determining, by the credential management system and in response to the searching, that no credential is specifically associated to the resource;

performing by the credential management system and in response to determining that no credential is specifically associated to the resource, additional searching for a credential that grants access to the resource to enable performing the application modernization operation but that is not specifically associated to the resource;

identifying, by the credential management system and in response to the additional searching, a credential included in the plurality of credentials, that grants access either to the resource or to resources of the resource type; and providing, by the credential management system and in response to receiving the notification, the identified credential via the API.

13. The medium of claim 12, wherein the resource comprises one of the following:
a virtual machine;
a container;
a cluster;
server management software; or
a collection object.

14. The medium of claim 12, wherein performing additional searching comprises:
searching for a hierarchical default credential associated to a hierarchical level above the hierarchical level at which the resource resides, wherein the hierarchical default credential grants access to all resources at the hierarchical level at which the resource resides.

15. The medium of claim 14, the operations further comprising, in response to searching for the hierarchical default credential:
determining that the hierarchical default credential is associated to the hierarchical level above the hierarchical level at which the resource resides; and
returning the hierarchical default credential.

16. The medium of claim 12, wherein performing additional searching comprises:
determining that no hierarchically default credential is associated to a hierarchical level above the hierarchical level at which the third resource resides; and
in response to determining that no hierarchically default credential is associated to a hierarchical level above the hierarchical level at which the third resource resides, searching for a global default credential associated to a root level of the plurality of levels.

17. The medium of claim 16, the operations further comprising: comprising, in response to searching for the global default credential:
determining that the global default credential is associated to the root level; and
returning the global default credential associated to the root level.

18. The medium of claim 12, the operations further comprising:
scanning, by an application modernization system, a data center;
identifying, based at least in part on the scanning, the application; and
notifying, by the application modernization system and via the API, the credential management system of the application modernization operation.

19. The medium of claim 16, wherein the resource is one of a plurality of similar resources, and wherein the identified credential provides access to each of the similar resources.

20. The medium of claim 12, wherein performing additional searching comprises:
determining that no specifically associated credential is associated to the resource; and
in response to determining that no specifically associated credential is associated to the resource, returning a global default credential associated to all resources having the same resource type as the resource.

21. The medium of claim 12, the operations further comprising, in response to providing the identified credential:
receiving, by an application modernization system and via the API, the identified credential;
accessing, by the application modernization system, the resource using the received credential; and
performing, by the application modernization system, the application modernization operation on the accessed resource.

22. The medium of claim 12, wherein the application modernization operation comprises containerizing an application.

23. A system comprising:
one or more processors including a hardware-based processor; and
a memory storage including a non-transitory computer-readable medium storing instructions which, when executed by the one or more processors including the hardware-based processor, performs operations comprising:
receiving, at credential management system and via an application programming interface (API), a notification identifying an application modernization operation to be performed on an application deployed by one of a plurality of resources arranged in a plurality of hierarchical levels;
identifying, by the credential management system, a resource on which the application modernization operation is to be performed, the resource having a resource type and residing at a hierarchical level of the plurality of hierarchical levels;
searching, by the credential management system and from among a plurality of credentials, for a credential that grants access to the resource to perform the application modernization operation, each of the plurality of credentials mapping to one of plurality of hierarchical levels;
determining, by the credential management system and in response to the searching, that no credential is specifically associated to the resource;
performing by the credential management system and in response to determining that no credential is specifically associated to the resource, additional searching for a credential that grants access to the resource to enable performing the application modernization operation but that is not specifically associated to the resource;
identifying, by the credential management system and in response to the additional searching, a credential included in the plurality of credentials, that grants access either to the resource or to resources of the resource type; and
providing, by the credential management system and in response to receiving the notification, the identified credential via the API.

24. The system of claim 23, wherein comprises one of the following:
a virtual machine;
a container;
a cluster;
server management software; or
a collection object.

25. The system of claim 23, wherein performing additional searching comprises:
in response to determining that no specifically associated credential is associated to the resource, searching for a hierarchical default credential associated to a hierarchical level above the hierarchical level at which the resource resides, wherein the hierarchical default credential grants access to all resources at the hierarchical level at which the resource resides.

26. The system of claim 25, the operations further comprising, in response to searching for the hierarchical default credential:
determining that the hierarchical default credential is associated to the hierarchical level above the hierarchical level at which the resource resides; and
returning the hierarchical default credential.

27. The system of claim 23, wherein performing additional searching comprises:

determining that no hierarchically default credential is associated to a hierarchical level above the hierarchical level at which the third resource resides; and in response determining that no hierarchically default credential is associated to a hierarchical level above the hierarchical level at which the third resource resides, searching for a global default credential associated to a root level of the plurality of levels.

28. The system of claim 27, the operations further comprising, in response to searching for the global default credential:

determining that the global default credential is associated to the root level; and returning the global default credential associated to the root level.

29. The system of claim 1, further comprising:

scanning, by an application modernization system, a data center;

identifying, based at least in part on the scanning, the application; and notifying, by the application modernization system and via the API, the credential management system of the application modernization operation.

30. The system of claim 23, wherein the resource is one of a plurality of similar resources, and wherein the identified credential provides access to each of the similar resources.

31. The system of claim 23, wherein performing additional searching comprises:

determining that no specifically associated credential is associated to the resource; and in response to determining that no specifically associated credential is associated to the resource, returning a global default credential associated to all resources having the same resource type as the resource.

32. The system of claim 23, the operations further comprising, in response to providing the identified credential:

receiving, by an application modernization system and via the API, the identified credential;

accessing, by the application modernization system, the resource using the received credential; and performing, by the application modernization system, the application modernization operation on the accessed resource.

33. The system of claim 23, wherein the application modernization operation comprises containerizing an application.

* * * * *